US008825348B2

(12) United States Patent
Harden et al.

(10) Patent No.: US 8,825,348 B2
(45) Date of Patent: Sep. 2, 2014

(54) EXHAUST GAS RECIRCULATION VALVE CONTAMINANT REMOVAL

(71) Applicant: Cummins Inc., Columbus, IN (US)

(72) Inventors: Jeremy Harden, Norman, IN (US); T. Andrew Craig, North Vernon, IN (US); James Eickmeyer, Franklin, IN (US); Amit Ashok Surve, Columbus, IN (US); Timothy R. Evans, Columbus, IN (US); Kerk B. McKeon, Columbus, IN (US); Scott A. Henry, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 13/848,423

(22) Filed: Mar. 21, 2013

(65) Prior Publication Data
US 2013/0213007 A1 Aug. 22, 2013

Related U.S. Application Data

(62) Division of application No. 12/459,860, filed on Jul. 8, 2009, now Pat. No. 8,423,269.

(51) Int. Cl.
| G06F 19/00 | (2011.01) |
| G06F 7/70 | (2006.01) |
| F02B 47/08 | (2006.01) |
| F02M 25/07 | (2006.01) |
| F02D 41/00 | (2006.01) |
| F02D 41/22 | (2006.01) |

(52) U.S. Cl.
CPC ....... F02M 25/0702 (2013.01); *F02M 25/0701* (2013.01); *F02D 41/0077* (2013.01); *F02D 41/0072* (2013.01); *F02D 41/22* (2013.01)
USPC ...................................... 701/114; 123/568.16

(58) Field of Classification Search
CPC ........... F02M 25/0702; F02M 25/0701; F02D 41/0077; F02D 41/0072; F02D 41/22
USPC ........... 123/568.11, 568.12, 568.16; 701/108, 701/114
See application file for complete search history.

(56) References Cited

U.S. PATENT DOCUMENTS

| 4,106,449 A | 8/1978 | Matsumoto et al. |
| 4,845,416 A * | 7/1989 | Scholl et al. .................. 318/600 |

(Continued)

FOREIGN PATENT DOCUMENTS

| CN | 101368529 | 2/2009 |
| EP | 0869276 | 10/1998 |
| JP | 2006207467 | 8/2006 |

OTHER PUBLICATIONS

International Search Report and Written Opinion, ISA/US PCT/US2012/001766, Cummins Inc., Aug. 13, 2010.

(Continued)

*Primary Examiner* — Hieu T Vo
*Assistant Examiner* — Sherman Manley
(74) *Attorney, Agent, or Firm* — Krieg DeVault LLP

(57) ABSTRACT

An exhaust gas purification system including an exhaust gas passageway which routes a flow of exhaust gas from an exhaust gas source to an intake manifold; an exhaust gas passageway valve which controls flow to the intake manifold; a cooling system coupled with the exhaust passageway positioned at a location upstream of the exhaust gas source and downstream of the intake manifold and operable to transfer heat from the flow of exhaust gas to a coolant in flow communication with the cooling system; a bypass passageway coupled with the exhaust gas passageway and bypassing the cooling system; a bypass valve operable to control flow through the bypass passageway; at least one valve operation sensor; and a controller operable to control the bypass valve to direct the flow of exhaust gas to the bypass passageway during exhaust gas recirculation based on a signal from the valve operation sensor.

13 Claims, 3 Drawing Sheets

(56) References Cited

U.S. PATENT DOCUMENTS

| | | | | |
|---|---|---|---|---|
| 5,297,047 | A * | 3/1994 | Matsuno | 701/107 |
| 5,501,201 | A * | 3/1996 | Miyoshi et al. | 123/568.24 |
| 5,503,131 | A * | 4/1996 | Ohuchi | 123/568.24 |
| 5,579,743 | A * | 12/1996 | Kadowaki | 123/568.24 |
| 5,769,390 | A * | 6/1998 | Ando | 251/129.11 |
| 5,894,209 | A * | 4/1999 | Takagi et al. | 318/696 |
| 5,921,224 | A * | 7/1999 | Sinnamon | 123/568.21 |
| 5,943,999 | A * | 8/1999 | Yoshihara et al. | 123/568.16 |
| 6,155,042 | A * | 12/2000 | Perset et al. | 60/278 |
| 6,182,645 | B1 * | 2/2001 | Tsuchiya | 123/568.23 |
| 6,224,034 | B1 * | 5/2001 | Kato et al. | 251/164 |
| 6,302,090 | B1 * | 10/2001 | Yokoyama et al. | 123/568.24 |
| 6,367,256 | B1 | 4/2002 | McKee | |
| 6,640,791 | B2 * | 11/2003 | Itoi et al. | 123/568.23 |
| 6,688,294 | B1 * | 2/2004 | Kawamura et al. | 123/568.24 |
| 6,826,903 | B2 | 12/2004 | Yahata et al. | |
| 6,848,434 | B2 * | 2/2005 | Li et al. | 123/568.12 |
| 6,989,045 | B2 | 1/2006 | Bailey et al. | |
| 7,104,522 | B2 | 9/2006 | Bircann | |
| 7,213,586 | B2 | 5/2007 | Wilson et al. | |
| 7,222,615 | B2 * | 5/2007 | Buck et al. | 123/568.12 |
| 7,257,950 | B2 | 8/2007 | Iwaszkiewicz | |
| 7,284,544 | B2 * | 10/2007 | Hatano | 123/568.12 |
| 7,363,919 | B1 * | 4/2008 | Styles | 123/568.12 |
| 7,476,269 | B2 * | 1/2009 | Begley et al. | 96/147 |
| 7,493,896 | B2 * | 2/2009 | El Tahry et al. | 123/568.12 |
| 7,581,532 | B2 * | 9/2009 | Hannewald et al. | 123/568.12 |
| 7,707,998 | B2 * | 5/2010 | Reuss et al. | 123/568.12 |
| 7,853,395 | B2 * | 12/2010 | Guo et al. | 701/102 |
| 7,918,084 | B2 * | 4/2011 | Tahara | 60/285 |
| 7,971,576 | B2 * | 7/2011 | Reuss et al. | 123/568.12 |
| 2006/0042608 | A1 * | 3/2006 | Buck et al. | 123/568.12 |
| 2006/0278204 | A1 | 12/2006 | Hatano | |
| 2008/0148720 | A1 * | 6/2008 | Tahara | 60/295 |
| 2008/0149080 | A1 * | 6/2008 | Reuss et al. | 123/568.12 |
| 2008/0155963 | A1 * | 7/2008 | Iida | 60/273 |
| 2008/0163855 | A1 * | 7/2008 | Matthews et al. | 123/568.12 |
| 2008/0276604 | A1 * | 11/2008 | Hosaka | 60/295 |
| 2009/0294711 | A1 * | 12/2009 | Labataille et al. | 251/129.05 |

OTHER PUBLICATIONS

English translation of First Office Action; Chinese Patent Office; Chinese Patent Application No, 201080030488,2; Oct. 2, 2013; 5 pages.

* cited by examiner

EXHAUST GAS RECIRCULATION VALVE CONTAMINANT REMOVAL

CROSS-REFERENCE TO RELATED APPLICATION

The present application is a divisional of U.S. patent application Ser. No. 12/459,860 entitled EXHAUST GAS RECIRCULATION VALVE CONTAMINANT REMOVAL, filed Jul. 8, 2009, which is incorporated herein by reference.

BACKGROUND

The present application generally relates to Exhaust Gas Recirculation (EGR), and more particularly, but not exclusively relates to EGR contaminant removal.

Typically, EGR engine applications mix a portion of the exhaust generated by a combustion reaction with intake air to improve engine performance. In some applications, soot, hydrocarbons, and/or other contaminants can accumulate in EGR systems that degrade performance and tend to result in the need for more frequent maintenance. Thus, there is a demand for further contributions in this area of technology.

SUMMARY

One embodiment of the present application is a unique EGR technique. Other embodiments include unique EGR apparatus, systems, devices, and methods. Further embodiments, forms, objects, features, advantages, aspects, embodiments and benefits shall become apparent from the following descriptions, drawings, and claims.

DETAILED DESCRIPTION OF REPRESENTATIVE EMBODIMENTS

Figure 1:
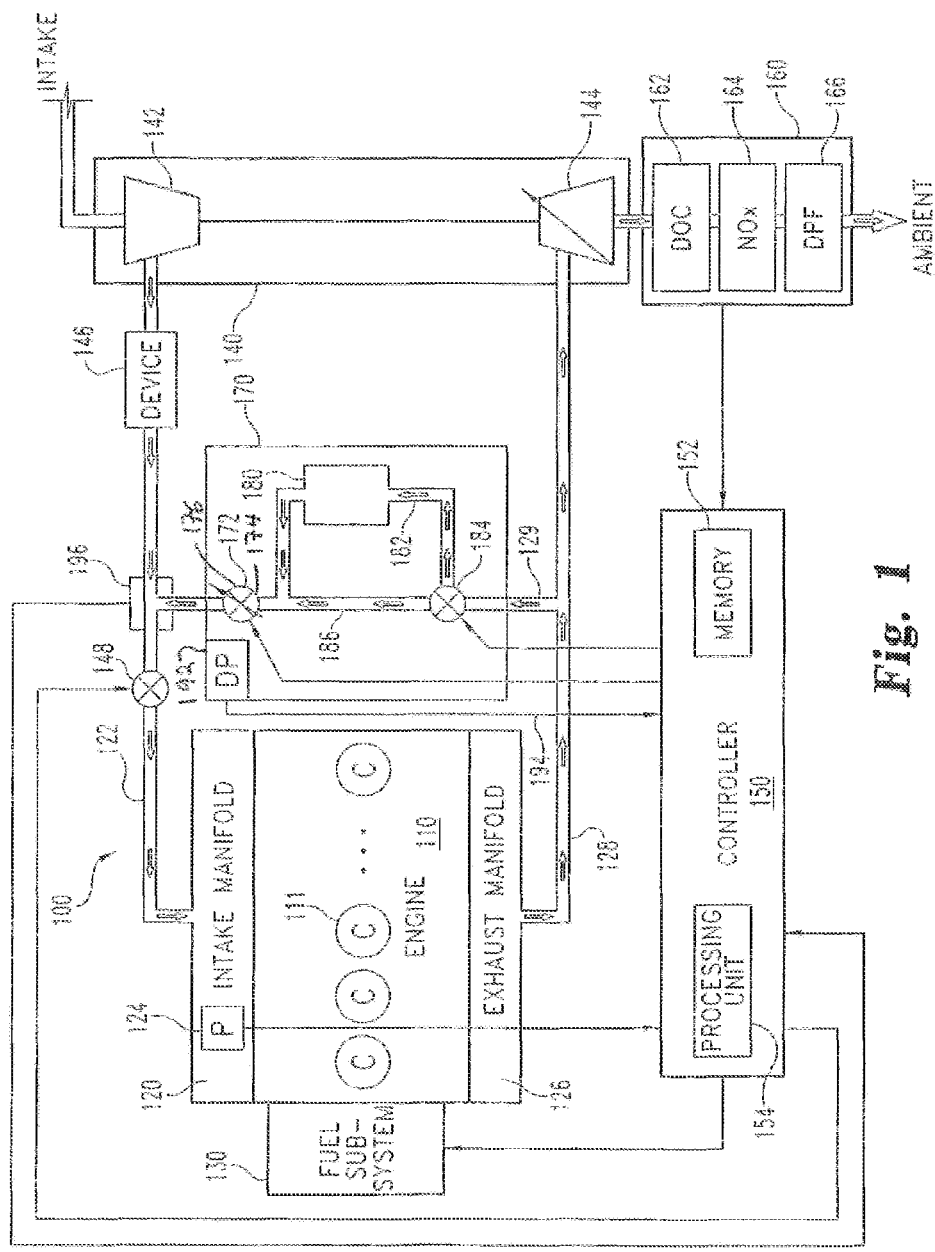
FIG. 1 is a schematic diagram of one embodiment of a system including an engine with EGR.

For the purposes of promoting an understanding of the principles of the invention, reference will now be made to the embodiment illustrated in the drawings and specific language will be used to describe the same. It will nevertheless be understood that no limitation of the scope of the invention is thereby intended, any alterations and further modifications in the disclosed inventions and embodiments of the present application, and any further applications of the principles of the inventions and embodiments disclosed herein are contemplated as would normally occur to one skilled in the art.

One embodiment of the present application includes a technique for removing contamination from EGR equipment. In certain EGR implementations, it has been discovered that contamination build-up on an EGR valve can be problematic but this build-up can be reduced by raising the temperature of the exhaust gases in the valve to a temperature higher than the temperature of the exhaust gases to which the EGR valve is nominally exposed during operation. By way of non-limiting example, the temperature in the EGR valve is raised to a temperature higher than the cooled exhaust that the valve nominally receives from an EGR exhaust cooling device by selectively routing a heating fluid to the valve. For such an arrangement, the heating fluid can be in the form of exhaust gases that at least partially bypasses the exhaust cooling device on a selective basis—to name just one possibility. Alternatively or additionally, such an arrangement may include a technique to determine a potential EGR contamination condition and correspondingly initiate valve heating in response to remove the valve contamination.

FIG. 1 illustrates system 100 of a further embodiment. System 100 includes an internal combustion engine 110 operating as an exhaust gas source. Engine 110 is of the reciprocating piston type having one or more reciprocating pistons 111 journaled to a crankshaft (not shown). In one form, engine 110 is of the four-stroke, diesel-fueled type with compression ignition and fuel injection. In other embodiments, engine 110 can be of a spark-ignited type, the two-stroke type, a rotary type such as a gas turbine engine, and/or may not utilize any form of fuel injection, to name just a few alternative possibilities. Furthermore, other embodiments may be differently fueled, such as by gasoline, ethanol, hydrogen, natural gas, propane, other gaseous fuels, and/or a hybrid combination of fuel types—just to mention some examples. System 100 may be used to provide power to mobile applications such as vehicles or stationary applications such as electrical power generators, pumps, and the like. In addition, system 100 may be used in hybrid applications that include one or more power sources in addition to engine 110, such as batteries, fuel cells—to name a few.

Engine 110 is fluidly coupled to an intake manifold 120 to receive air for combustion and an exhaust manifold 126 to discharge exhaust from engine 110. Intake manifold 120 is in fluid communication with an intake passageway 122. Exhaust manifold 126 is in fluid communication with an exhaust passageway 128. System 100 further includes a turbocharger 140 with a compressor 142 driven by a variable geometry turbine 144. Turbine 144 is powered by exhaust from engine 110 flowing through exhaust passageway 128 to an exhaust aftertreatment system 160. Turbocharger 140 may be a single variable geometry type, but other types and/or numbers of turbochargers may be utilized as well. Alternatively, in other embodiments turbocharger 140 may be absent. Also, system 100 includes an Exhaust Gas Recirculation (EGR) system 170 in fluid communication with both intake passageway 122 and exhaust passageway 128. Engine 110 is regulated by a controller 150. Controller 150 is operatively connected to an engine fuel subsystem 130 to modulate engine fueling and regulate related processes.

Typically, controller 150 is included in a standard type of Engine Control Module (ECM), including one or more types of memory 152. Controller 150 can be an electronic circuit comprised of one or more components, including digital circuitry, analog circuitry, or both. Controller 150 may be a software and/or firmware programmable type; a hardwired, dedicated state machine; or a combination of these. In one embodiment, controller 150 is a programmable microcontroller solid-state integrated circuit that integrally includes one or more processing units and memory 152. Memory 152 can be comprised of one or more components and can be of any volatile or nonvolatile type, including the solid state variety, the optical media variety, the magnetic variety, a combination of these, or such different arrangement as would occur to those skilled in the art. Further, when multiple processing units are present, controller 150 can be arranged to distribute processing among such units, and/or to provide for parallel or pipelined processing if desired. Controller 150 functions in accordance with operating logic defined by programming, hardwire, or a combination of these. In one form, memory 152 stores programming instructions executed by a processing unit 154 of controller 150 to embody at least a portion of this operating logic. Alternatively or additionally, memory 152 stores data that is manipulated by the operating logic of controller 150. Controller 150 can include signal conditioners, signal format converters (such as analog-to-digital and digital-to-analog converters), limiters, clamps, filters, and the like as needed to perform various control and regulation operations described in the present application. Controller 150 receives various inputs and generates various outputs to perform various operations as described hereinafter in accordance with its operating logic.

During engine 110 operation, ambient air is inducted from the atmosphere and is compressed by compressor 142 of turbocharger 140 to produce a pressurized charge air. In addition to raising pressure, compression typically raises the temperature of the charge air. For the depicted embodiment, a cooling device 146 is included to cool the charge air before supplying it to engine 110. The compressed charge air is supplied to engine 110 through intake manifold 120 that is in fluid communication with engine 110. An air intake throttle valve 148 is positioned between compressor 142 and engine 110 that is operable to control the amount of charge air that reaches engine 110 from compressor 142. Air intake throttle valve 148 is operatively connected to and controlled by controller 150, but may be controlled by other control devices as well. In other embodiments, air intake throttle valve 148 and/or controller 150 may be absent.

An intake manifold pressure sensor 124 is connected with intake manifold 120. Intake manifold pressure (MAP) sensor 124 is operative to sense the amount of air pressure in intake manifold 120, which is indicative of the amount of charge air flowing or provided to engine 110. Intake manifold pressure sensor 124 is operatively connected with controller 150 and generates electric signals representative of intake pressure that are sent to controller 150 for control/regulation purposes. In one embodiment, MAP sensor 124 along with an intake air pressure sensor (not shown) in flow communication with EGR system 170 can be utilized to calculate an EGR mass fraction which is an indication of the amount of EGR gases being supplied to intake manifold 120.

Exhaust gases produced by engine 110 leave through exhaust manifold 126 connected with engine 110. Under typical operating conditions, a portion of the exhaust gas is routed through aftertreatment system 160 and a portion is routed through EGR system 170. Exhaust aftertreatment system 160 includes a diesel oxidation catalyst unit 162, an adsorber which is preferably a NOx adsorber or lean NOx trap 164 but could be other types of adsorbers or other NOx emissions control devices, and a diesel particulate filter 166. Exhaust aftertreatment system 160 is operable to reduce unwanted emissions from exhaust gas exiting engine 110 after combustion. In other embodiments, some or all of these components may differ as would occur to those skilled in the art, may be in a different order relative to exhaust flow, may include additional aftertreatment components, or may be absent.

For the illustrated embodiment of FIG. 1, diesel oxidation catalyst unit 162 is configured as a flow device with a substrate carrying a catalyst. The catalyst typically includes one or more types of catalytic metals. As exhaust gas from engine 110 traverses diesel oxidation catalyst unit 162, heat, carbon monoxide, molecular hydrogen, and/or radical HydroCarbons (HCs) may be formed that assist with the operation of NOx adsorber 164. Also, some nitrogen monoxide may be converted into nitrogen dioxide, which is more readily stored by adsorber 164.

Relative to the exhaust stream, NOx adsorber 164 is positioned downstream of diesel oxidation catalyst unit 162 and is operable to adsorb NOx and SOx emitted from engine 110 to reduce their emission into the atmosphere. NOx adsorber 164 includes catalyst material to store NOx and SOx and selectively purge them after reaching a certain storage capacity (a regeneration of adsorber 164) when purging. Under nominal conditions, the stored material is discharged in a different molecular form than the undesired emissions being reduced—for instance, nitrogen in NOx is typically converted and discharged as $N_2$ during regeneration.

Diesel particulate filter 166 may include one or more of several types of particle filters. Diesel particulate filter 166 is utilized to capture unwanted diesel particulate matter from the flow of exhaust gas exiting engine 110. Diesel particulate matter may include sub-micron size particles found in diesel exhaust, including both solid and liquid particles, as well as fractions such as inorganic carbon (soot), organic fraction (often referred to as SOF or VOF), and sulfate fraction (hydrated sulfuric acid). Diesel particulate filter 166 may be regenerated at regular intervals by combusting particulates collected in diesel particulate filter 166. Regeneration of diesel particulate filter 166 is achieved, for example, through temperature control which is achieved, for example, by control of other components of aftertreatment system 160, EGR system 170, fueling subsystem 130 and/or turbocharger 140.

Aftertreatment system 160 may further include a number of temperature, pressure, oxygen, NOx, and/or other sensors (not shown) within or between its various constituents that provide corresponding input to controller 150 to regulate aftertreatment operation through adjustment of upstream processes, such as engine fueling, EGR operation (described hereinafter), and the like.

EGR system 170 may be used to reduce the temperature of the engine combustion process by mixing a selectable amount of exhaust gas with the charge air being supplied by compressor 142. Lower temperature combustion tends to reduce the amount of NOx produced during combustion. EGR system 170 includes an EGR cooler 180. EGR cooler 180 may be in the form of one or more liquid, charge air, and/or other types of cooling devices structured to cool the exhaust gas before being supplied to the intake side of engine 110 with the compressed charge air from air intake throttle valve 148. Furthermore, it is contemplated that high pressure loop EGR systems, low pressure loop EGR systems, multiple loop EGR systems and variations thereof may be useful.

Figure 2:
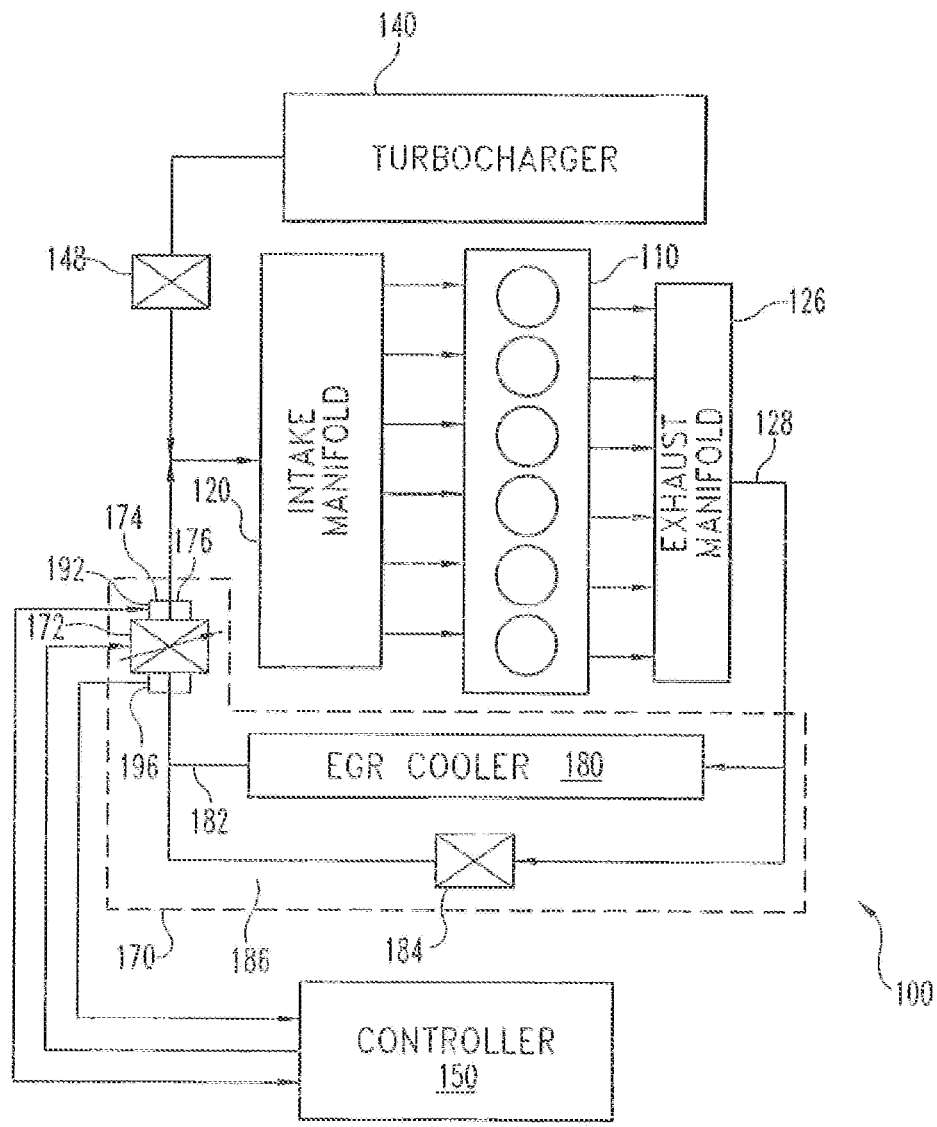
FIG. 2 is a further schematic diagram of the system of FIG. 1 detailing certain EGR aspects.

Referring additionally to FIG. 2, an additional schematic of system 100 is illustrated; where like reference numerals refer to like features previously described. EGR system 170 includes and EGR valve 172 in fluid communication with the outlet of exhaust manifold 126 and air intake manifold 120. EGR valve 172 is operatively controlled by controller 150, which selectively modulates the flow rate of cooled exhaust gases received from EGR cooler 180 in correspondence to different degrees of valve flow restriction between a fully opened and a fully closed state.

EGR valve 172 is actuated by an actuator 174 in the form of a stepper motor 176. Stepper motor 176 is operatively coupled to controller 150 and responds to control signals therefrom to change the degree to which EGR valve 172 is open or closed and correspondingly the degree of flow through EGR valve 172 relative to a range of discrete, incremental steps. EGR system 170 further includes a differential pressure sensor 192 to sense the pressure difference across EGR valve 172. Operation signal 194, shown in FIG. 1, is sent to controller 150 to represent the change in pressure across EGR valve 172, which is designated delta-P (or the "DP"

signal). In addition, FIG. 2 shows a temperature sensor 196 provided to detect the temperature of the exhaust flowing through EGR valve 172 and provide a corresponding EGR temperature signal representative of the same to controller 150.

In one implementation, the degree of exhaust flow through EGR valve 172 (the "EGR fraction") is determined by controller 150 as a function of DP and a direct or indirect estimate of NOx in the exhaust stream to correspondingly regulate exhaust emissions performance. This regulation may further take into account the temperature represented by the EGR temperature signal from sensor 196. Additionally or alternatively, air intake throttle valve 148 and EGR system 170, in conjunction with fuel subsystem 130, may be controlled by controller 150 in response to its various inputs to run engine 110 in a rich mode or in a lean mode and to otherwise control operations of system 100 to regulate emissions, operating efficiency, and the like.

EGR system 170 further includes an EGR bypass valve 184 coupled to an EGR passageway 129 and an EGR bypass passageway 186. EGR passageway 129 is in fluid communication with exhaust passageway 128. EGR cooler 180 is in fluid communication with an EGR cooler passageway 182. EGR bypass valve 184 is of a binary type with two operational states—opened or closed (on/off or bypass/no bypass). In other embodiments, it may provide for flow modulation like EGR valve 172 with a varying degree of openness and closure or be differently arranged as would occur to those skilled in the art. When EGR bypass valve 184 is in the bypass position (opened), some or all of the exhaust gas flowing through EGR passageway 129 flows through EGR bypass passageway 186. When EGR bypass valve 184 is in the cooler position (closed), all of the exhaust gas flowing through EGR passageway 129 flows through EGR cooler 180 to further cool the exhaust gas before being supplied to air intake manifold 120 in combination with the compressed air passing through air Intake throttle valve 148. EGR valve 172 is positioned downstream of both EGR cooler passageway 182 and EGR bypass passageway 186.

Unfortunately, it has been discovered that as a result of cooling the exhaust gas, soot, HC vapors, and/or other exhaust content tends to unacceptably accumulate on EGR valve 172, resulting in restricted flow, restricted valve movement, and/or causing EGR valve 172 to "stick" in a given position—to name just a few undesired effects. More particularly, for nominal operations of at least some diesel engines employing a cooled EGR system, the accumulation on the EGR valve can (1) coat the EGR valve components preventing actuation or (2) create a build up that modifies the dimensions of the exhaust flow path and therefore modifies the flow and heat characteristics of the EGR and intake air composition. For the depicted embodiment of system 100, it has been found that as contamination builds-up on EGR valve 172, the number of steps of stepper motor 176 needed to achieve the same flow rate compared to EGR valve 172 without contamination can serve as an indication that an unacceptable contamination condition has been reached.

In one embodiment, stepper motor 176 has 31 steps to fully close. When stepper motor 176 exceeds 35 steps to reach fully closed, the unacceptable contamination condition has been reached and a contamination reduction process as more fully described below is initiated. In another embodiment, the contamination condition detection approach can be considered relative to the pressure differential signal DP, which can be used to determine when EGR valve 172 is fully closed or in some other pre-defined position based on the pressure differential. In other words, if the number of steps it takes varies relative to some expected value of the pressure differential, that variation can be used to determine whether a contamination condition exists.

It should be appreciated that in other embodiments, only a portion of the recirculating exhaust bypasses the EGR cooler such that recirculating exhaust flows through both the bypass passageway and the cooler passageway—providing a form of partial bypass operation. Alternatively or additionally, the bypass valve may be arranged relative to the EGR cooler to reroute some or all of the recirculating exhaust after it passes through a portion of the EGR cooler—providing another form of partial bypass operation. Still other variations might include aspects of both these partial bypass options and/or provide the ability to select between partial and full bypass operating modes.

Figure 3:
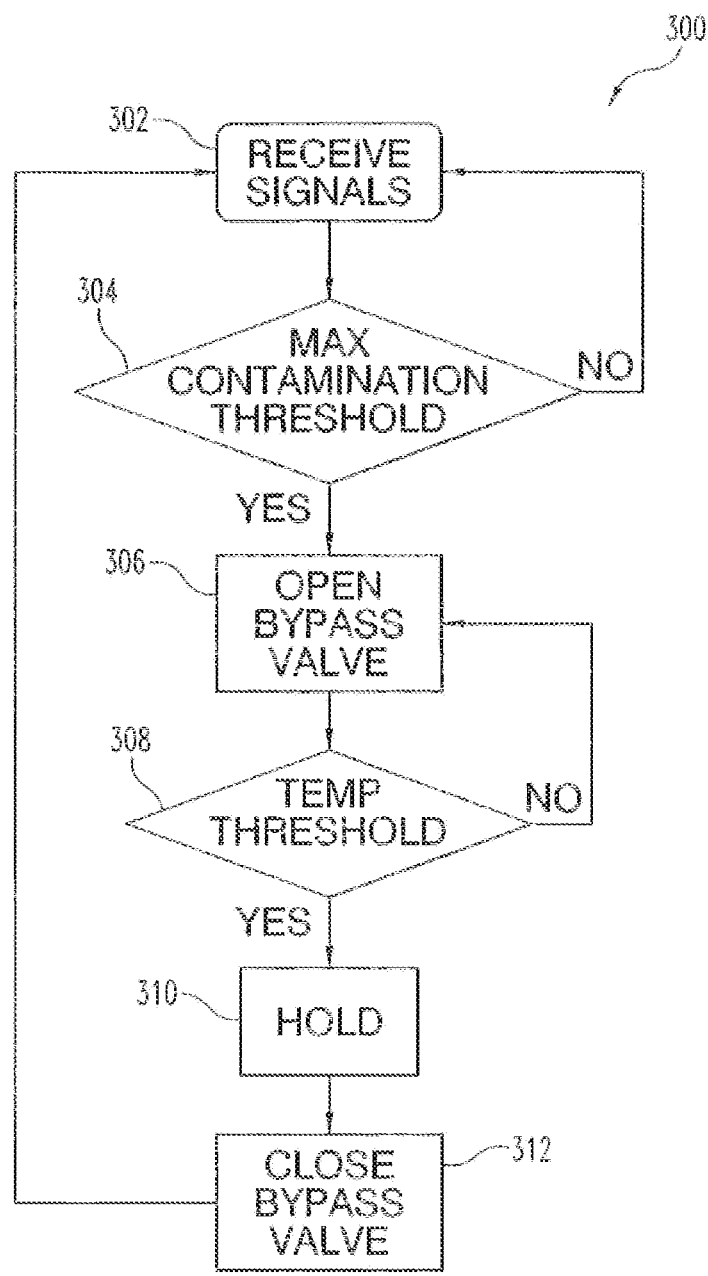
FIG. 3 is a flow diagram of a procedure that can be performed with the system of FIG. 1.

FIG. 3 is a schematic flow diagram of procedure 300 for reducing contamination of EGR valve 172. Procedure 300 may be implemented tor system 100 and performed in accordance with operating logic executed by controller 150. Procedure 300 includes operation 302 to receive signals from a first sensor 192 and a second sensor 196. One form notes the incremental steps needed to actuate stepper motor 176 to put EGR valve 172 in a predefined state or as indicated by differential pressure sensor 192. Procedure 300 further includes a conditional 304 to test whether a contamination condition exists to such an extent that it needs to be addressed. In one form, this test is performed by determining if the number of incremental steps executed with stepper motor 176 necessary to reach a closed position has been exceeded. Another form determines if the number of steps necessary to provide a given DP value corresponds to a valve with unacceptable contamination build-up. In other forms, one or more different sensors and/or determination techniques may be additionally or alternatively utilized to test whether there is a contamination condition.

If the test of conditional 304 is false (no contamination condition), then procedure 300 returns to operation 302. On the other hand, if the test of conditional 304 is true, a contamination condition is declared. Controller 150 triggers the opening of bypass valve 100 in accordance with its operating logic in operation 306, allowing the exhaust gas temperature to remain elevated as it moves through system 100. Operation 306 can include a complete bypass of EGR cooler 180 or a partial bypass. Procedure 300 continues with conditional 308 to determine the temperature of EGR valve 172 based on the signal from second sensor 196.

If the test of conditional 308 is false (temperature has not met a threshold valve), then procedure 300 returns to operation 306 adjusting bypass valve 100 and the amount of flow bypassing EGR cooler 180. Again procedure 300 determines the temperature of EGR valve 172 in conditional 308. Once the test of conditional 308 responds true indicating EGR valve 172 has reached a target temperature range, procedure 300 moves to operation 310 where controller 150 holds bypass valve 184 in the adjusted position for a set amount of time. Consequently, the temperature of EGR valve 172 becomes elevated relative to the nominal temperature of cooled exhaust exiting EGR cooler 180. Operation 310 also continues to monitor EGR valve 172 temperature to ensure the temperature does not rise above the target temperature range to prevent over-temperature damage (if applicable).

Actuation of EGR bypass valve 184 to the open position for specified periods of time allows the temperature to rise in EGR valve 172. The flow of higher temperature exhaust gas initiates an oxidation or "burning" process within EGR valve 172 which reduces most, if not all common contaminants and may eliminate some or all of them. In one embodiment, the set amount of time EGR bypass valve 184 is held open is approximately five minutes. In another embodiment, the target temperature range of EGR valve 172 is between 550° and 700° F. Following the completion of the hold time in operation 310, procedure 300 moves to operation 312 where controller 150 signals the close of bypass valve 184 and resets procedure 300. System 100 begins procedure 300 over by observing signals from first sensor 192 and second sensor 196 in operation 302.

Alternatively or additionally, bypass valve 184 can be opened to provide for a more rapid heat-up of engine 110 through the intake side during various transient states as compared to cooled exhaust irrespective of contamination, and otherwise used to augment system performance as would occur to those skilled in the art.

There are many other embodiments of the present invention. For example, in one form, a bypass valve is used to bypass just a portion of flow through EGR cooler 180, which may be used in conjunction with or without one or more other bypass circuits similar to or different from system 100. Alternatively or additionally, heating of EGR valve 172 may be implemented by directing a heating fluid to it selectively by a medium other than exhaust and/or by structure other than EGR bypass valve 184. For instance, a heating packet may be included to which a heating fluid (such as a liquid, gas, or combination) is selectively routed to raise the temperature of EGR valve 172 above that provided by exhaust from EGR cooler 180 and correspondingly reduce contamination.

In still a further example, one embodiment includes generating an exhaust gas stream with an internal combustion engine. The engine including one or more reciprocating pistons; routing at least a portion of the exhaust gas stream through an exhaust gas cooler; controlling the flow of cooled exhaust gas from the exhaust gas cooler with a first valve device, the cooled exhaust gas having a first temperature; detecting a contamination condition of the first valve device; and in response to the contamination condition, increasing the first temperature of the first valve device to a second temperature greater than the first temperature to remove contamination therefrom.

One embodiment of an exhaust gas purification system of the present invention includes an exhaust gas source; an exhaust gas passageway configured to route a flow of exhaust gas from the exhaust gas source to an intake portion of the exhaust gas source; an exhaust gas passageway valve operable to control flow to the intake portion of the exhaust gas source; a cooling system being flow coupled with the exhaust gas passageway positioned in a location upstream of the exhaust gas source and downstream of the intake portion of the exhaust gas source and able to transfer heat from the flow of exhaust gas to a coolant in flow communication with the cooling system; a bypass passageway flow coupled with the exhaust gas passageway and bypassing the cooling system; a bypass valve able to control flow through the bypass passageway; at least one valve operation sensor; and a controller able to control the bypass valve to direct the flow of exhaust gas to the bypass passageway during exhaust gas recirculation based on a signal from the valve operation sensor.

Further inventive variations of this embodiment include a valve operation sensor with means for determining a degree of valve actuation and means for signaling to a controller when the exhaust gas passageway valve reaches a valve actuation threshold, and/or a valve operation which is an exhaust flow sensor positioned at a location downstream from the exhaust gas passageway valve and operates to send a signal to the controller when the exhaust gas flow reaches an exhaust flow threshold. Alternatively or additionally other inventive variations include at least one exhaust gas passageway valve temperature sensor positioned at a location upstream from an exhaust gas passageway valve where the controller is able to receive a signal from the exhaust gas passageway valve temperature sensor and where the controller operates a bypass valve to maintain an exhaust gas passageway valve temperature.

Still other inventive variations include an exhaust gas passageway valve temperature which is maintained between 550°-700° F., the controller operating the bypass valve to maintain an exhaust gas passageway valve temperature for a predetermined amount of time, the predetermined amount of time being five minutes, and/or the controller operating to repeat operation of the bypass valve to maintain the exhaust gas passageway valve temperature for a predetermine amount of time at least a number of eight repetitions.

In one embodiment, during exhaust gas recirculation, the controller controls the bypass valve to divert the flow of exhaust gas through the cooling system when the exhaust gas passageway valve operation sensor indicates that a valve operation threshold has been met and the exhaust gas passageway valve temperature sensor has not met an exhaust gas passageway temperature threshold. The controller is able to send a bypass signal to the bypass valve to control the exhaust gas passageway valve temperature.

Another embodiment includes generating an exhaust gas stream with an internal combustion engine, the engine including one or more reciprocating pistons; routing at least a portion of the exhaust gas stream through an exhaust gas cooler; modulating flow of the exhaust gas stream from the exhaust gas cooler with a first valve device for intake by the engine; detecting a contamination condition of the first valve device; in response to the contamination condition, rerouting at least some of the exhaust gas stream to at least partially bypass the exhaust gas cooler and raise the temperature of the first valve device to reduce valve contamination. In other inventive variations of this embodiment, the routing of at least a portion of the exhaust gas stream Includes conducting the stream through an exhaust recirculation system to an intake portion of the engine where the exhaust recirculation system includes an exhaust gas recirculation control valve and an exhaust gas cooler bypass valve, and/or the rerouting of at least some of the exhaust gas stream which includes adjusting the exhaust gas cooler bypass valve and where adjusting the exhaust gas cooler bypass valve effectuates increasing the flow of the exhaust gas stream to at least partially bypass passage of the stream through the exhaust cooler. Alternatively or additionally still other inventive variations include detecting a contamination condition by operating an exhaust flow sensor positioned at a location downstream from the first valve device and/or detecting a contamination condition by observing a degree of valve actuation of the first valve device.

Another embodiment includes generating an exhaust gas stream with an internal combustion engine where the engine includes one or more reciprocating pistons; routing at least a portion of the exhaust gas stream through an exhaust gas recirculation system; controlling flow of exhaust gas through the exhaust gas recirculation system with a first valve device, the exhaust gas having a first temperature; detecting a contamination condition of the first valve device; and in response to the contamination condition, increasing the first temperature of the first valve device to a second temperature greater than the first temperature to remove contamination from the first valve device.

Other inventive variations of this embodiment include an exhaust gas cooler where the exhaust gas cooler operates to transfer Heat from the flow of exhaust gas, and/or the exhaust gas recirculation system further includes a bypass passageway which bypasses the exhaust gas cooler and a second valve device which operates to control flow of the exhaust gas through the bypass passageway. Alternatively or additionally still other inventive variations include increasing the temperature of the first valve device including rerouting at least a portion of the exhaust gas stream through the bypass passageway when operating the second valve device, detecting a contamination condition including observing a degree of valve actuation of the first valve device, and/or detecting a contamination condition including operating an exhaust flow sensor positioned at a location downstream from the first valve device, A further embodiment includes an internal combustion engine with one or more reciprocating pistons; means for generating an exhaust gas stream with the engine; means for routing at least a portion of the exhaust gas stream through an exhaust gas cooler; means for modulating flow of the exhaust gas stream from the exhaust gas cooler with a first valve device for intake by the engine; means for detecting a contamination condition of the first valve device; and means for rerouting at least some of the exhaust gas stream to at least partially bypass the exhaust gas cooler and raise the temperature of the first valve device to reduce valve contamination in response to the contamination condition.

Yet a further embodiment includes an internal combustion engine with one or more reciprocating pistons; means tor generating an exhaust gas stream with the engine; means for routing at least a portion of the exhaust gas stream through an exhaust gas recirculation system; means for controlling flow of exhaust gas through the exhaust gas recirculation system with a first valve device; means for detecting a contamination condition of the first valve device; and means for increasing temperature of the first valve device to remove contamination from the first valve device in response to the contamination condition.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exhaust gas purification system comprising:
    an exhaust gas source;
    an exhaust gas passageway configured to route a flow of exhaust gas from the exhaust gas source to an intake portion of the exhaust gas source;
    a cooling system being flow coupled with the exhaust gas passageway positioned at a location upstream of the exhaust gas source and downstream of the intake portion of the exhaust gas source and operable to transfer heat from the flow of exhaust gas to a coolant in flow communication with the cooling system;
    a bypass passageway flow coupled with the exhaust gas passageway and bypassing the cooling system;
    an exhaust gas recirculation valve in the exhaust gas passageway that is in flow communication with and downstream of the cooling system and the bypass passageway, wherein the exhaust gas recirculation valve is operable to selectively modulate a flow rate of cooled exhaust gas from the cooling system to the intake portion, wherein the exhaust gas recirculation valve is connected with a stepper motor that is operable to open and close the exhaust gas recirculation valve;
    a bypass valve operable to control flow through the bypass passageway and the cooling system;
    at least one valve operation sensor connected to the exhaust gas recirculation valve; and
    a controller operable to control the bypass valve to direct the flow of exhaust gas to the bypass passageway and bypass the cooling system to heat the exhaust gas recirculation valve during exhaust gas recirculation based on a signal from the valve operation sensor, wherein the controller is configured to detect a contamination condition of the exhaust recirculation valve in response to a signal from the at least one valve operation sensor indicating a number of incremental steps to open or close the exhaust gas recirculation valve exceeds a predetermined number of steps and to control the bypass valve to bypass the cooling system and direct the flow of exhaust gas to the bypass passageway to heat the exhaust gas recirculation valve in response detection of the contamination condition.

2. The system of claim 1 wherein the valve operation sensor includes means for determining a degree of valve actuation and means for signaling to the controller when the exhaust gas recirculation valve reaches a valve actuation threshold.

3. The system of claim 1 wherein the valve operation sensor is an exhaust flow sensor positioned at a location downstream from the exhaust gas recirculation valve and operates to send a signal to the controller when the exhaust gas flow reaches an exhaust flow threshold.

4. The system of claim 1 further including at least one exhaust gas recirculation valve temperature sensor positioned at a location upstream from the exhaust gas recirculation valve wherein the controller is operable to receive a signal from the exhaust gas recirculation valve temperature sensor and wherein the controller operates the bypass valve to maintain an exhaust gas recirculation valve temperature.

5. The system of claim 4 wherein the exhaust gas recirculation valve temperature is between 550°-700° F.

6. The system of claim 5 wherein the controller operates the bypass valve to maintain an exhaust gas recirculation valve temperature for a predetermined amount of time.

7. The system of claim 6 wherein the predetermined amount of time is five minutes.

8. The system of claim 6 wherein the controller operates to repeat operation of the bypass valve to maintain the exhaust gas recirculation valve temperature for a predetermined amount of time.

9. The system of claim 1 wherein during exhaust gas recirculation the controller controls the bypass valve to divert the flow of exhaust gas through the cooling system when the exhaust gas recirculation valve operation sensor indicates that a valve operation threshold has been met and the exhaust gas recirculation valve temperature sensor has not met an exhaust gas passageway temperature threshold.

10. The system of claim 1 wherein controller is operable to send a bypass signal to the bypass valve to control the exhaust gas recirculation valve temperature.

11. The system of claim 1, further comprising a temperature sensor operable to provide a temperature signal to the controller corresponding to a temperature of the exhaust gas recirculation valve, and the controller is configured to control the bypass valve to increase the temperature of the exhaust gas recirculation valve to a target temperature range to remove contamination therefrom.

12. The system of claim 11, wherein the target temperature range is at least 450° F.

13. The system of claim 12, wherein the temperature of the exhaust gas recirculation valve is maintained in the target temperature range for at least 5 minutes to remove contamination.

\* \* \* \* \*